United States Patent [19]
Davis

[11] 3,833,245
[45] Sept. 3, 1974

[54] CYLINDRICAL BELLOWS
[75] Inventor: William R. Davis, Louisville, Ky.
[73] Assignee: Chemetron Corporation, Chicago, Ill.
[22] Filed: Dec. 14, 1972
[21] Appl. No.: 315,046

[52] U.S. Cl............. 285/226, 29/472.1, 285/286, 285/93
[51] Int. Cl. ............................................. F16l 21/00
[58] Field of Search ............ 285/226, 286, 93, 227, 285/228, 229; 29/471.1, 472.1; 138/142

[56] References Cited
UNITED STATES PATENTS
2,232,657 2/1941 Davis .................................. 285/226
2,434,224 1/1948 Paul .................................... 285/226
2,785,459 3/1957 Carpenter ....................... 285/222 X
3,169,785 2/1965 Ziebold .............................. 285/226
3,628,923 12/1971 White ............................ 29/472.1 X Primary Examiner—Dave W. Arola
Attorney, Agent, or Firm—N. M. Esser

[57] ABSTRACT

An end of a cylindrical bellows is mounted around and to a cylindrical surface by a method comprising the steps of depositing circumferential weldment on the surface in spaced relation to the end of the cylindrical bellows and depositing circumferential weldment on the surface as butt weldment therebetween.

9 Claims, 6 Drawing Figures

PATENTED SEP 3 1974  3,833,245

3,833,245

CYLINDRICAL BELLOWS

BACKGROUND OF THE INVENTION

This invention pertains to cylindrical bellows commonly employed as fluid-containing expansion joints in various applications. Such bellows, which usually are circular in cross-section, can be employed not only to permit relative movement of the structures to which opposite ends of the bellows are mounted but also to contain various fluids. Such bellows having multiple plies, as are conventional in many applications, additionally can be employed not only to provide multiple fluid-containing barriers but also to facilitate leak detection through known techniques whereby the space between two plies can be maintained at controlled pressure and monitored to detect pressure change indicative of a leak in either ply. Several examples of such bellows having multiple plies and known techniques for leak detection are described in U.S. Pats. No. 3,183,022, No. 3,299,417, No. 3,472,062, and No. 3,655,224.

These patents also describe various techniques to mount opposite ends of such bellows to supporting structures. Particularly, FIG. 2 of U.S. Pat. No. 3,472,062 and FIG. 2 of U.S. Pat. No. 3,655,224, show respective examples in which a circumferential butt weld is deposited on such a tubular support between each end of the plies of a two-ply bellows and a shoulder on the support. Similar circumferential butt welds have been found, in extensive testing, to have superior fatique characteristics when compared to fillet welds. For certain applications, butt welds to weld opposite ends of a pressure containing ply of a bellows to suitable supports are required effectively under applicable codes (e.g. ASME Boiler and Pressure Vessel Code).

In some installations, supporting structures having suitable shoulders to permit such circumferential butt welds to be employed at opposite ends of a bellows of given length, as in the examples discussed above, may not be available. There remains a need for a new and improved technique for mounting an end of a bellows to a cylindrical surface by satisfactory cylindrical butt weldment.

SUMMARY OF THE INVENTION

Accordingly, one object of this invention is to provide a new and improved method of mounting an end of a cylindrical bellows to a cylindrical surface. Broadly, this object may be attained in a method comprising the steps of depositing a circumferential weldment on such surface in spaced relation to such end and depositing a circumferential weldment on such surface as a butt weldment therebetween.

Likewise, another object of this invention is to provide a new and improved combination in a cylindrical bellows mounted at one end to a cylindrical surface. Broadly, this object may be attained in a combination comprising a circumferential weldment deposited on such surface in spaced relation to such end and a circumferential weldment deposited on said surface as a butt weldment therebetween.

This invention applies to a multiple-ply bellows as well as to a single-ply bellows. With a multiple-ply bellows, annular spacers may be inserted to maintain radial spacing as between adjacent plies.

These and other objects, features, and advantages of this invention will be evident from the following description, with the aid of the accompanying drawing, of a preferred mode of carrying out this invention.

DETAILED DESCRIPTION OF PREFERRED MODE

FIGS. 1 through 5 illustrate a tubular end portion 20 of a bellows B having concentric inner and outer plies 22 and 24 respectively. Preferably, the bellows B is of the type disclosed in copending U.S. Pat. application Ser. No. 315,259, filed Dec. 14, 1972, and assigned to the assignee of this invention. The plies of a bellows of the type disclosed in said application are in radial registry with each other along a series of circumferential convolutions. Furthermore, as disclosed in said application, an intermediate ply is removed, after the inner, intermediate, and outer plies of a bellows have been sectioned into longitudinal sections, to provide, between the inner and outer plies to be reformed as intact plies from appropriate sections welded together, radial spacing approximately equal to the thickness of the intermediate ply.

Figure 5:
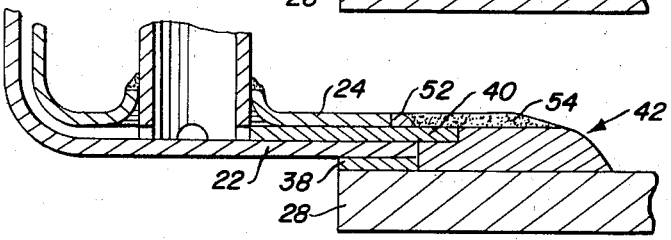

The tubular end portion 20 is mounted to an outer cylindrical surface 26 of a tubular supporting structure 28 generally similar in its function to the respective tubular nipples described in U.S. Pat. No. 3,655,224, and other structures to which opposite ends of a bellows can be mounted. As indicated in FIG. 5, a fitting 30 generally of the type described in said patent and other patents mentioned above is inserted through an opening 32 having an outwardly drawn outlet 34 in the outer ply 24 and is welded to the outlet 34 by circumferential weldment 36. A plurality of lateral orifices 30a in the fitting 30 allow fluid flow between the fitting 30 and the space between the plies 22 and 24. As described in said patent and other patents mentioned above, such space may be maintained at controlled pressure and monitored, through the fitting 30 to detect pressure change indicative of a leak in either ply.

As shown in FIGS. 1 through 5, an annular spacer 38 is inserted between the inner ply 22 and the surface 26. Such spacer is not necessary if the inner ply 22 fits closely around the tubular supporting structure 28. Likewise, an annular spacer 40 (FIGS. 3 through 5) is inserted between the plies 22 and 24. Circumferential weldment 42 (FIG. 5) is deposited to weld together the plies 22 and 24, the tubular supporting structure 28, and the spacers 38 and 40. The weldment 42 is a composite of a series of circumferential weldments deposited in the sequence next to be described.

Figure 1:
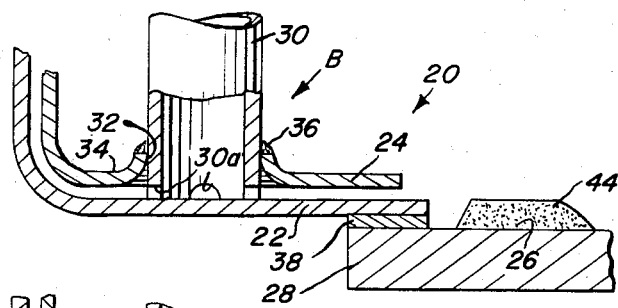
FIGS. 1 through 5 are fragmentary sections, sequentially presented, of certain steps in a method of mounting an end of a cylindrical bellows to a cylindrical surface.
Figure 2:
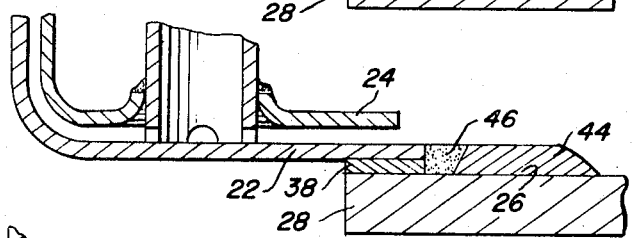

As shown in FIGS. 1 and 2, a first circumferential weldment 44 is deposited on the surface 26 of the support 28 in spaced relation to the inner ply 22 and the spacer 38, and a second circumferential weldment 46 is deposited on the surface 26 as a circumferential butt weld between the first circumferential weldment 44 on one side and the inner ply 22 and the spacer 38 on another side. In known manner, these weldments may be finished and tested as by liquid penetrant.

The use of a circumferential butt weld between the pressure-containing inner ply 22 and the support 28 is a particularly important aspect of this invention. Such a butt weld has been found in extensive testing to have substantially superior fatigue characteristics as compared to a fillet weld.

Figure 3:
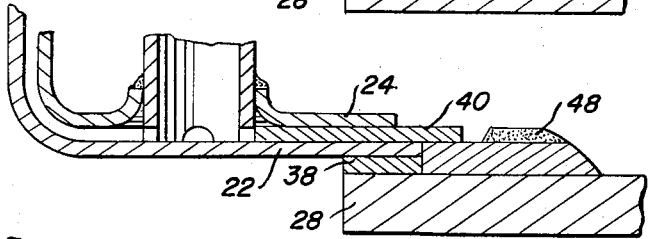
Figure 4:
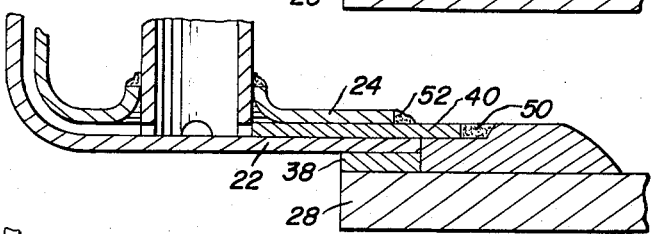

As shown in FIGS. 3 and 4, the spacer 40 is inserted between the plies 22 and 24, a third circumferential weldment 48 is deposited on the combination of the first circumferential weldment 44 and the circumferential butt weld 46 in spaced relation to the spacer 40, and a fourth circumferential weldment 50 is deposited on such combination to fill the space between the third circumferential weldment 48 and the spacer 40. In known manner, these weldments may be finished and tested by liquid penetrant.

As shown in FIGS. 4 and 5, a fifth circumferential weldment 52 is deposited on the spacer 50 and against the outer ply 24, and a sixth circumferential weldment 54 is deposited on the combination of the spacer 40, and third circumferential weldment 48, and the fourth circumferential weldment 50, and against the fifth circumferential weldment 52. In known manner, these weldments may be finished and tested as by liquid penetrant.

Figure 6:
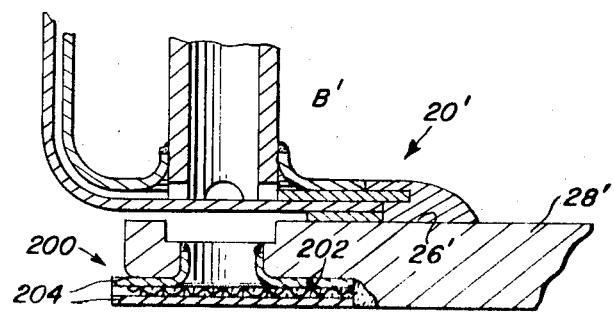
FIG. 6 is an analogous view of another application thereof.

FIG. 6 illustrates a possible alternative arrangement whereby a tubular end portion 20' of a bellows B' similar to the bellows B is mounted in the manner described above to a radially outer surface 26' of a tubular supporting structure 28'. A tubular end portion 200 of another bellows originally had been mounted to a radially inner surface 202 of the tubular supporting structure 28' and substantially has been cut away (at the edges 204) to permit such bellows to be replaced by the bellows comprising the tubular end portion 20', preferably in the manner disclosed in copending U.S. Pat. application Ser. No. 315,047, filed Dec. 14, 1972, and assigned to the assignee of this invention.

I claim:

1. A method of mounting an end of a cylindrical bellows having inner and outer plies around and to a cylindrical surface comprising the steps of depositing a first circumferential weldment on said surface in spaced relation to said inner ply at said end, depositing a second circumferential weldment on said surface as a butt weldment welding said first circumferential weldment to said inner ply, and depositing additional circumferential weldment to weld said outer ply to the combination of said first and second circumferential weldments.

2. The method of claim 1 wherein an annular spacer is inserted between said inner ply at said end and said surface and welded to said surface by said second circumferential weldment.

3. The method of claim 1 wherein an annular spacer is inserted between said plies at said end and welded to the combination of said first and second circumferential weldments by said additional circumferential weldment.

4. A method of mounting an end of a cylindrical bellows having inner and outer plies to a cylindrical surface comprising the steps of depositing a first circumferential weldment on said surface in spaced relation to one said inner ply of said plies at said end, depositing a second circumferential weldment on said surface as butt weldment welding said first circumferential weldment to said inner ply, inserting an annular spacer between said plies at said end, depositing a third circumferential weldment on the combination of said first and second circumferential weldments in spaced relation to said spacer, depositing a fourth circumferential weldment on said combination between said third circumferential weldment and said spacer, depositing a fifth circumferential weldment on said spacer and against said outer ply, and depositing a sixth circumferential weldment on the combination of said spacer and said third and fourth circumferential weldments and against said fifth circumferential weldment.

5. The method of claim 4 wherein an annular spacer is inserted between said surface and said inner ply and is welded to said surface by said second circumferential weldment. spaced 6. In a cylindrical bellows having concentric inner and outer plies and being mounted at one end to a cylindrical surface, the combination comprising a first circumferential weldment deposited on said surface in spaced relation to said inner ply at said end, a second circumferential weldment deposited on said surface as a butt weldment welding said first circumferential weldment to said inner ply, and additional circumferential weldment deposited on the subcombination of said first and second circumferential weldments to weld said outer ply to said subcombination.

7. The combination of claim 6 further comprising an annular spacer inserted between said inner ply and said surface and welded to said surface by said second circumferential weldment.

8. The combination of claim 6 further comprising an annular spacer inserted between said plies at said end.

9. The combination of claim 8 wherein said additional circumferential weldment comprises a third circumferential weldment deposited on said subcombination in spaced relation to said spacer, a fourth circumferential weldment deposited on said subcombination between said third circumferential weldment and said spacer, a fifth circumferential weldment deposited on said spacer and against said outer ply, and a sixth circumferential weldment deposited on the subcombination of said spacer and said third and fourth circumferential weldments and against said fifth circumferential weldment.

* * * * *